United States Patent [19]
Liu

[11] Patent Number: 5,914,587
[45] Date of Patent: Jun. 22, 1999

[54] CIRCUIT FOR REDUCING SWITCHING LOSSES OF A POWER CONVERTER AND METHOD OF OPERATION THEREOF

[75] Inventor: Rui Liu, Plano, Tex.

[73] Assignee: Lucent Technologies Inc., Murray Hill, N.J.

[21] Appl. No.: 08/906,536

[22] Filed: Aug. 5, 1997

[51] Int. Cl.$^6$ .................................................. G05F 1/10
[52] U.S. Cl. .......................................... 323/222; 323/225
[58] Field of Search .................................... 323/222, 282, 323/225, 259, 350, 351; 361/18, 84

[56] References Cited

U.S. PATENT DOCUMENTS

| | | | |
|---|---|---|---|
| 5,262,930 | 11/1993 | Hua et al. | 363/21 |
| 5,307,004 | 4/1994 | Carsten | 323/222 |
| 5,307,005 | 4/1994 | Ahladas et al. | 323/222 |
| 5,313,382 | 5/1994 | Farrington | 363/16 |
| 5,486,752 | 1/1996 | Hua et al. | 323/222 |
| 5,543,704 | 8/1996 | Thorén | 323/222 |

OTHER PUBLICATIONS

Publication entitled "A Comparison of Voltage Mode Soft Switching Methods for PWM Converters" by K. Mark Smith and Keyue M. Smedley: 1996 IEEE; pp. 291–298.

Publication entitled "High Efficiency Telecom Rectifier Using a Novel Soft–Switched Boost–Based Input Current Shaper" by Robert Streit and Daniel Tollik; Intelec; Nov. 1991; pp. 720–726.

Publication entitled "Novel Zero–Voltage–Transition PWM Converters" by Guichao Hua, Ching–Shan Leu, and Fred C. Lee; 1992 IEEE; pp. 55–61.

*Primary Examiner*—Shawn Riley

[57] ABSTRACT

In a power converter having a power train that includes a power switch and a rectifier for conducting forward currents from the power switch, a circuit for, and method of, reducing switching losses associated with the power train. The circuit includes: (1) an auxiliary switch and an inductor coupled to the power train that reduce a switching loss associated with the power switch and (2) an impedance element series-coupled to the rectifier that reduces a change in current through the rectifier thereby decreasing a reverse recovery current flowing therethrough.

20 Claims, 3 Drawing Sheets

FIG. 2B PRIOR ART   $I_{Lin}$  $I_{La}$

FIG. 4B  $I_{Lin}$  $I_{La}$

CIRCUIT FOR REDUCING SWITCHING LOSSES OF A POWER CONVERTER AND METHOD OF OPERATION THEREOF

TECHNICAL FIELD OF THE INVENTION

The present invention is directed, in general, to power supplies and, more specifically, to a circuit for reducing switching losses associated with a power converter and a method of operation thereof.

BACKGROUND OF THE INVENTION

A power converter is a power processing circuit that converts an input voltage or current source waveform into a specified output voltage or current waveform. A switched-mode power converter is a frequently employed power converter that converts an input voltage waveform into a specified output voltage waveform. A boost power converter is one example of a switched-mode converter that converts the input voltage to an output voltage that is greater than the input voltage. Typically, the boost power converter is employed in off-line applications wherein power factor correction is required and a stable regulated voltage is desired at the output of the power converter.

A non-isolated boost power converter generally includes an energy storage device (e.g., an inductor) coupled between the input voltage and an inverter or power switch. The power switch is then coupled to a rectifier (e.g., a power diode) and an output capacitor. The load is connected in parallel to the capacitor. Again, the output voltage (measured at the load) of the boost power converter is always greater than the input voltage. When the power switch is conducting, the diode is reverse biased thereby isolating the output stage. During this period, the input voltage supplies energy to the inductor. When the power switch is not conducting, the output stage receives the energy stored in the inductor for delivery to the load coupled to the output of the converter.

Analogous to other types of power converters, a boost converter is subject to inefficiencies that impair the overall performance of the power converter. More specifically, the power switch and rectifier are subject to conduction and switching losses that reduce the efficiency of the power converter. Additionally, during the turn-on interval of the power switch, the power diode is also subject to a reverse recovery condition that induces a substantial current spike through the power switch and diode. Furthermore, the power switch [e.g., a metal-oxide semiconductor field-effect transistor (MOSFET)] is subject to losses when a charge built-up in the device dissipates during the turn-on transition period of the switch. The losses associated with the power switch and rectifier increase linearly as the switching frequency of the power converter escalates. Therefore, efforts to minimize the losses associated with the power converter and, more specifically, the switching losses associated with the power switch and rectifier will improve the overall efficiency of the power converter.

Efforts to reduce the switching losses associated with the switching devices of the power converter have been the subject of many references. For instance, Novel Zero-Voltage-Transition PWM Converters, by Hua, et al., IEEE Power Electronics Specialists Conference, p. 55–61 (1992) (incorporated herein by reference), addresses the issue of switching losses associated with switching regulators. Hua, et al., attempt to reduce dissipative losses associated with a power switch and diode of a switching regulator. In pertinent part, Hua, et al., couple a auxiliary switch and pilot inductor to a tap of the main inductor of the switching regulator. With the auxiliary switch and inductor, Hua, et al., attempt to limit a rate of the change in current across the diode and decrease a voltage across the power switch to reduce the turn-on switching losses associated with the power switch. While addressing the basic problem associated with the turn-on losses of the power switch, Hua, et al., fail to resolve an inherent contradiction that arises in the operation of the switching regulator.

The contradiction in the design develops for the following reasons. By employing a relatively large pilot inductor, the reverse recovery current through the diode decreases due to the fact that the rate of the change in current through the diode is diminished. The negative effect of employing a relatively large pilot inductor, however, is that it takes a longer period of time to discharge a charge across the power switch thereby extending the time period to achieve zero-voltage switching (ZVS) at the turn-on of the power switch. The extended time period to achieve ZVS defines the on-time of the auxiliary switch resulting in additional conduction losses associated therewith. The opposite situation occurs when a relatively small pilot inductor is employed in the switching regulator. Under these circumstances, the charge across the power switch is discharged at a faster rate to accommodate ZVS, but, in turn, a reduction of the reverse recovery current of the diode is limited and additional switching losses occur in the auxiliary switch. Hua, et al. therefore introduce additional dissipative losses (e.g., conduction loss in the auxiliary switch) in an attempt to achieve ZVS and reduce the reverse recovery condition in the power circuit. Hua, et al., is just one example of a failure adequately to resolve dissipative losses (e.g., conduction loss in the auxiliary switch) associated with the switching regulators.

Accordingly, what is needed in the art is a circuit that reduces the dissipative losses associated with the power train of a power converter that overcomes, among other things, the contradiction inherent in designs presently available.

SUMMARY OF THE INVENTION

To address the above-discussed deficiencies of the prior art, the present invention provides, in a power converter having a power train that includes a power switch and a rectifier for conducting forward currents from the power switch, a circuit for, and method of, reducing switching losses associated with the power train. The circuit includes: (1) an auxiliary switch and an inductor coupled to the power train that reduce a switching loss associated with the power switch and (2) an impedance element series-coupled to the rectifier that reduces a change in current through the rectifier thereby decreasing a reverse recovery current flowing therethrough.

The conduction and switching losses associated with the power train are reduced by coupling the auxiliary switch and inductor to the power train and by series-coupling the impedance element to the rectifier. For reasons that will become more apparent, the present invention resolves the contradictions of the prior art by employing the auxiliary switch and inductor to achieve substantially ZVS for the power switch while, at the same time, employing the impedance element series-coupled to the rectifier to reduce the reverse recovery current through the rectifier. The present invention, therefore, substantially reduces the dissipative losses associated with the power train (even with a minimal conduction loss associated with the auxiliary switch) thereby producing a more efficient power converter.

The foregoing has outlined, rather broadly, features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 2A to 2F illustrate current and voltage waveforms of selected characteristics of the boost power converter of FIG. 1;

FIGS. 4A to 4H illustrate current and voltage waveforms of selected characteristics of the boost power converter of FIG. 3;

DETAILED DESCRIPTION

Figure 1:
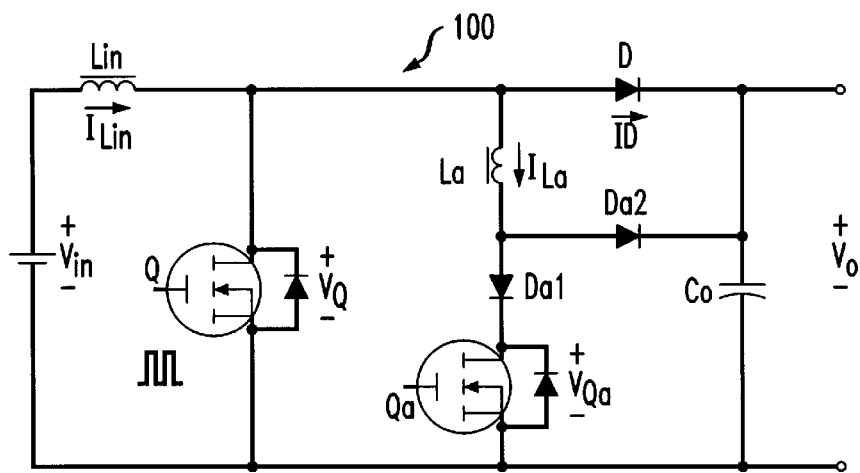
FIG. 1 illustrates a schematic diagram of boost power converter employing a prior art circuit for reducing switching losses associated therewith.

Referring initially to FIG. 1, illustrated is a schematic diagram of boost power converter (or boost converter) 100 employing a prior art circuit for reducing switching losses associated therewith. The boost converter 100 includes an input voltage source $V_{in}$, an input inductor $L_{in}$, a power switch Q, a power diode D, an output capacitor $C_o$ and the circuit for reducing switching losses associated with the power train. The boost converter 100 provides a voltage $V_o$ at the output thereof. The circuit includes an auxiliary switch $Q_a$, an inductor $L_a$ and first and second auxiliary diodes $D_{a1}$, $D_{a2}$.

Figure 2A:
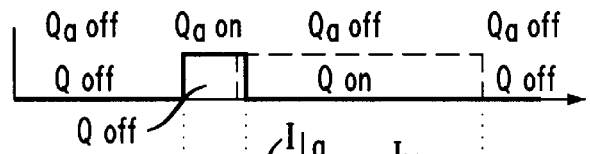
Figure 2A:
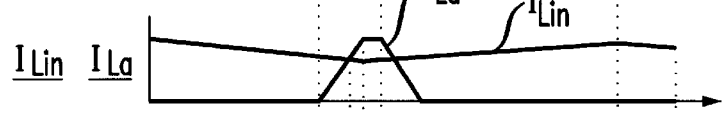
Figure 2A:
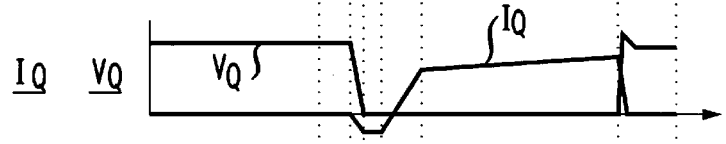
Figure 2A:
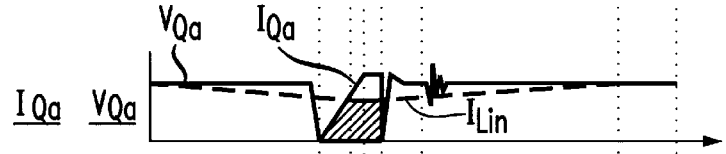
Figure 2A:
Figure 2A:
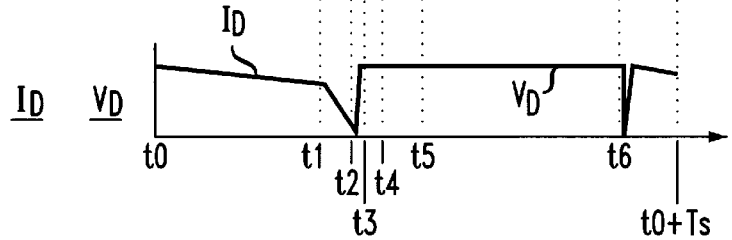

Turning jointly now to FIGS. 2A through 2F, illustrated are current and voltage waveforms of selected characteristics of the boost converter 100 of FIG. 1. In particular, FIG. 2A represents the conduction and nonconduction periods of the power switch Q and auxiliary switch $Q_a$. FIG. 2B represents an input inductor current $I_{Lin}$ and an inductor current $I_{La}$. FIG. 2C represents a voltage $V_Q$ and current $I_Q$ associated with the power switch Q. FIG. 2D represents a voltage $V_{Qa}$ and current $I_{Qa}$ associated with the auxiliary switch $Q_a$. FIG. 2E represents a voltage $V_{Da2}$ and current $I_{Da2}$ associated with the second auxiliary diode $D_{a2}$. FIG. 2F represents a voltage $V_D$ and current $I_D$ associated with the power diode D.

With continuing reference to FIG. 1, the operation of the boost converter 100 will hereinafter be described. In general, the value of the input inductor $L_{in}$ is substantially larger than the value of the inductor $L_a$ and the auxiliary switch $Q_a$ is smaller than the power switch Q. Beginning with the power switch Q and auxiliary switch $Q_a$ in a nonconducting state, the current $I_{Lin}$ through the input inductor $L_{in}$ is carried by the power diode D. The to auxiliary switch $Q_a$ is, then, transitioned to a conducting state. The auxiliary switch $Q_a$ exhibits a modest turn-on switching loss since the auxiliary switch $Q_a$ is relatively small. When the auxiliary switch $Q_a$ is conducting, the output voltage $V_o$ is applied to the inductor $L_a$ and induces the current $I_{La}$ to flow therethrough. The current $I_D$ through the power diode D is equal to the difference between the input inductor current $I_{Lin}$ and the inductor current $I_{La}$. When the inductor current $I_{La}$ equals the input inductor current $I_{Lin}$, the current $I_D$ through the power diode D is obviously zero.

A further increase in the inductor current $I_{La}$ induces a current to flow through a parasitic capacitance of the power switch Q, thereby discharging the parasitic capacitance. When the voltage $V_Q$ across the power switch Q is reduced to zero, the power switch Q is transitioned to a conducting state under a substantially ZVS condition and the auxiliary switch $Q_a$ is transitioned to a nonconducting state. Concurrently, the current $I_D$ in the power diode D ramps downward but a change in current over time (di/dt) of the current $I_D$ associated with the power diode D induces a reverse recovery current across the power diode D. The inductor $L_a$ reduces the change in current across the power diode D to lessen the effects of the reverse recovery current on the power diode D.

The circuit suffers from several deficiencies that limit its ability to reduce the conduction and switching losses associated with the boost converter 100. First, prior to discharging the parasitic capacitance of the power switch Q, the auxiliary switch $Q_a$ must conduct the current $I_{Lin}$ through the input inductor $L_{in}$ (see FIG. 2D). Therefore, the auxiliary switch $Q_a$ suffers a penalty of an additional conduction loss. Additionally, the rising rate of the current $I_{Qa}$ in the auxiliary switch $Q_a$ must be moderated otherwise the reverse recovery current of the power diode D induces an additional switching loss in the auxiliary switch $Q_a$. This condition, however, increases the conduction period of the auxiliary switch $Q_a$ thereby leading to additional conduction losses.

In its attempt to reduce the switching losses associated with the power train of the boost converter 100, the prior art as illustrated and described introduces additional conduction losses associated with the auxiliary switch $Q_a$ that cannot be attenuated (again, see FIG. 2D). More specifically, to reduce the conduction losses associated with the auxiliary switch $Q_a$, the conduction period for the auxiliary switch $Q_a$ must be decreased. As a result, the inductance of the inductor $L_a$ must be reduced, thereby increasing the falling rate of the power diode D and leading to an increase in the reverse recovery current through the power diode D. As previously mentioned, the aforementioned contradiction leads to dissipative losses in the boost converter 100 that cannot be attenuated.

Additionally, the current $I_{La}$ through the inductor $L_a$ is carried by the second auxiliary diode $D_{a2}$ when the auxiliary switch $Q_a$ is transitioned to a nonconducting state (see FIG. 2E). Consequently, the second auxiliary diode $D_{a2}$ is also subject to a reverse recovery condition when the current $I_{La}$ in the inductor $L_a$ is discharged to zero at the rate of:

$V_o/L_a$.

Thus, an additional snubber element (such as a saturable reactor) is necessary to minimize the reverse recovery loss associated with the turn-off of the second auxiliary diode $D_{a2}$.

Figure 3:
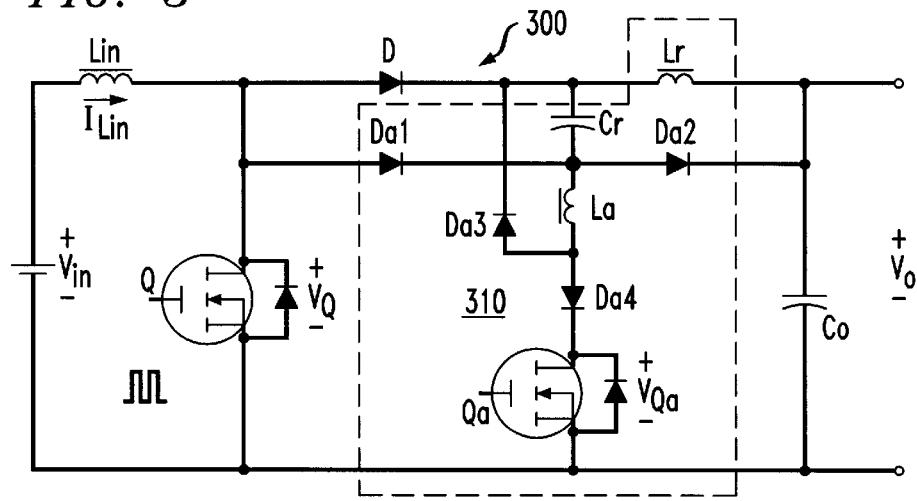
FIG. 3 illustrates a schematic diagram of an embodiment of a boost power converter employing an embodiment of a circuit constructed according to the principles of the present invention.

Turning now to FIG. 3, illustrated is a schematic diagram of an embodiment of a boost power converter (or boost converter) 300 employing an embodiment of a circuit 310 constructed according to the principles of the present invention. The boost converter 300 includes an input voltage source $V_{in}$, an input inductor $L_{in}$, a power switch [e.g., a metal-oxide semiconductor field-effect transistor (MOSFET) Q], a rectifier (e.g., a power diode D), an output filter (e.g., an output capacitor $C_o$) and the circuit 310 of the present invention. The boost converter 300 provides a voltage $V_o$ at the output thereof. The circuit 310 includes an auxiliary switch (e.g., a MOSFET) $Q_a$ and a blocking diode $D_{a4}$, an impedance element (e.g., a snubber inductor) $L_a$, a snubber capacitor $C_r$, and a first, second and third auxiliary diode $D_{a1}$, $D_{a2}$, $D_{a3}$. For reasons that will hereinafter become more apparent, the circuit resolves the inherent contradictions and shortcomings of the prior art.

Figure 4A:
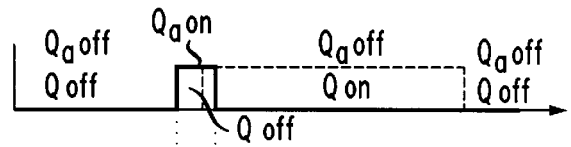
Figure 4A:
Figure 4A:
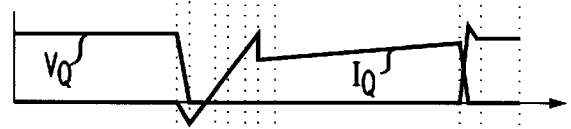
Figure 4A:
Figure 4A:
Figure 4A:
Figure 4A:
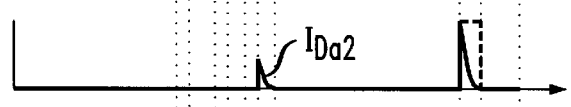
Figure 4A:
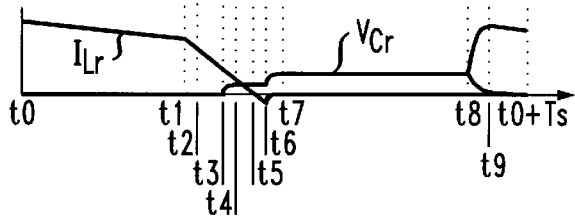

Turning now to FIGS. 4A to 4H, illustrated are current and voltage waveforms of selected characteristics of the boost converter 300 of FIG. 3. In particular, FIG. 4A represents the conduction and nonconduction periods of the power switch Q and auxiliary switch $Q_a$. FIG. 4B represents an input inductor current $I_{Lin}$ and an inductor current $I_{La}$. FIG. 4C represents a voltage $V_Q$ and current $I_Q$ associated with the power switch Q. FIG. 4D represents a voltage $V_{Qa}$ and current $I_{Qa}$ associated with the auxiliary switch $Q_a$. FIG. 4E represents a voltage $V_{Da3}$ and current $I_{Da3}$ associated with the third auxiliary diode $D_{a3}$. FIG. 4F represents a voltage $V_D$ and current $I_D$ associated with the power diode D. FIG. 4G represents a voltage $V_{Da2}$ and current $I_{Da2}$ associated with the second auxiliary diode $D_{a2}$. FIG. 4H represents a current $I_{Lr}$ through the snubber inductor $L_r$ and a voltage $V_{Cr}$ across the snubber capacitor $C_r$.

With continuing reference to FIG. 3, the operation of the boost converter 300 is hereinafter described. In general, the value of the input inductor $L_{in}$ (e.g., 150 μH) is larger than the value of the snubber inductor $L_r$ (e.g., 5 μH) and the inductor $L_a$ (e.g., 1 μH); also, the auxiliary switch $Q_a$ is smaller than the power switch Q. Beginning with the power switch Q and auxiliary switch $Q_a$ in a nonconducting state, the input inductor current $I_{Lin}$ through the input inductor $L_{in}$ is carried by the power diode D; also, the voltage $V_{Cr}$ across the snubber capacitor $C_r$ is approximately zero and the voltages $V_Q$, $V_{Qa}$ across the power switch and auxiliary switch Q, $Q_a$, respectively, are approximately equal to the output voltage $V_o$. The auxiliary switch $Q_a$ is, then, transitioned to a conducting state and the voltage $V_{Qa}$ there across ramps down to zero; also, the output voltage $V_o$ is applied to the inductor $L_a$. A current $I_{La}$ is induced in the inductor $L_a$ and is increased at a rate of:

$\Delta I_{La} = (V_0/L_a) \Delta t$ amps/sec.

The inductor current $I_{La}$ across the inductor $L_a$ induces a current to flow through a parasitic capacitance of the power switch Q to discharge the parasitic capacitance. The current $I_D$ across the power diode D, however, is moderated by the snubber inductor $L_r$ and the decrease in rate of the current $I_{Lr}$ across the inductor $L_r$ is:

$\Delta I_{Lr} = -[(V_0 - V_Q)/L_r] \Delta t$ amps/sec.

Note that the input inductor current $I_{Lin}$ is relatively constant during the transition period because the value of the input inductor $L_{in}$ is larger than the value of the snubber inductor $L_r$ and the inductor $L_a$. Also, since the value of the snubber inductor $L_r$ is larger than the value of the inductor $L_a$, the net current change across the snubber inductor $L_r$ is less than the net current change across the inductor $L_a$. Thus, once a current is built up in the auxiliary switch $Q_a$, the parasitic capacitance of the power switch Q is discharged, almost immediately. Remember that, in the boost converter of FIG. 1, the parasitic capacitance of the power switch Q can only be discharged if the current through the auxiliary switch $Q_a$ is higher than the input inductor current $I_{Lin}$.

When a voltage $V_Q$ across the power switch Q is reduced to substantially zero, the power switch Q is transitioned to a conducting state under a substantially zvs condition. Concurrently, the current $I_D$ in the power diode D ramps downward but at a rate of:

$\Delta I_D = -(V_0/L_r) \Delta t$ amps/sec.

The change in current over time of the current $I_D$ associated with the power diode D induces a reverse recovery current across the power diode D. The reverse recovery current, however, is significantly reduced due to the impedance presented by the snubber inductor $L_r$. Additionally, following the turn-off of the power diode D, the energy stored in the snubber inductor $L_r$ may then be transferred to the snubber capacitor $C_r$ through the second auxiliary diode $D_{a2}$ and, eventually, recovered to the output of the boost converter 300.

Alternatively, external capacitors (not shown) can be added in parallel with the power switch Q and the power diode D further to reduce voltage spikes. Energy stored in these external capacitors may be recovered to the snubber capacitor $C_r$ and finally to the output of the boost converter 300.

As delineated in FIGS. 4A, 4C, the auxiliary switch $Q_a$ may also be turned off after the drain-to-source voltage $V_Q$ of the power switch Q discharges to zero. After the auxiliary switch $Q_a$ is transitioned to a nonconducting state, the energy stored in the inductor $L_a$ is recovered to the snubber capacitor $C_r$ through the third auxiliary diode $D_{a3}$. Once the energy is recovered by the snubber capacitor $C_r$, the third auxiliary diode $D_{a3}$ is turned off and exhibits a small amount of reverse recovery loss. The reverse recovery loss associated with the third auxiliary diode $D_{a3}$, however, is much smaller than the reverse recovery loss associated with the second auxiliary diode $D_{a2}$ of the boost converter 100 of FIG. 1. The reverse recovery loss associated with the third auxiliary diode $D_{a3}$ is smaller because the falling rate of the current $I_{Da3}$ when the third auxiliary diode $D_{a3}$ is turned off is:

$\Delta I_{Da3} = -(\Delta V_{Cr}/L_a)$ amps/sec, where the voltage $V_{Cr}$ is generally much smaller than the output voltage $V_0$ and the inductance of the inductor $L_a$ is smaller (e.g., about ⅕) of the inductance of the snubber inductor $L_r$. As previously mentioned, the smaller the falling rate of the current across a diode the smaller the resulting reverse recovery current. Thus, a snubber element is not required to suppress the reverse recovery current associated with the third auxiliary diode $D_{a3}$. Furthermore, when the power switch Q is transitioned from a conducting to a nonconducting state (at time period $t_5$), the energy stored in the snubber capacitor $C_r$ is transferred to the output of the boost converter 300 through the first auxiliary diode $D_{a1}$.

The auxiliary switch $Q_a$ and the inductor $L_a$, coupled to the power switch Q, reduce switching losses associated with the power switch Q. The snubber inductor $L_r$, series-coupled to the power diode D, reduces the reverse recovery current associated with the power diode D. The snubber capacitor $C_r$ and first, second and third auxiliary diodes $D_{a1}$, $D_{a2}$, $D_{a3}$ recover energy stored in the inductor $L_a$ and the snubber inductor $L_r$ and deliver the energy to the output of the boost converter 300. The circuit 310, therefore, substantially reduces the switching losses associated with the power train of the boost converter 300 with only a minimal conduction loss introduced by the auxiliary switch $Q_a$. The overall efficiency of the boost converter 300 is, in turn, enhanced.

The resulting operation of the boost converter 300 provides several advantages. For instance, the time period to complete the ZVS transient can be reduced to about half (e.g., 600 ns in the prior art to about 250 ns) of the prior art with the circuit of the present invention. Also, the peak current through the auxiliary switch $Q_a$ is reduced thereby significantly decreasing the conduction losses associated therewith. As a result, the switching and conduction losses associated with the switching components (including the reverse recovery current of the power diode D) of the boost converter are reduced with the circuit of the present invention leading to a more efficient boost converter.

Figure 5:
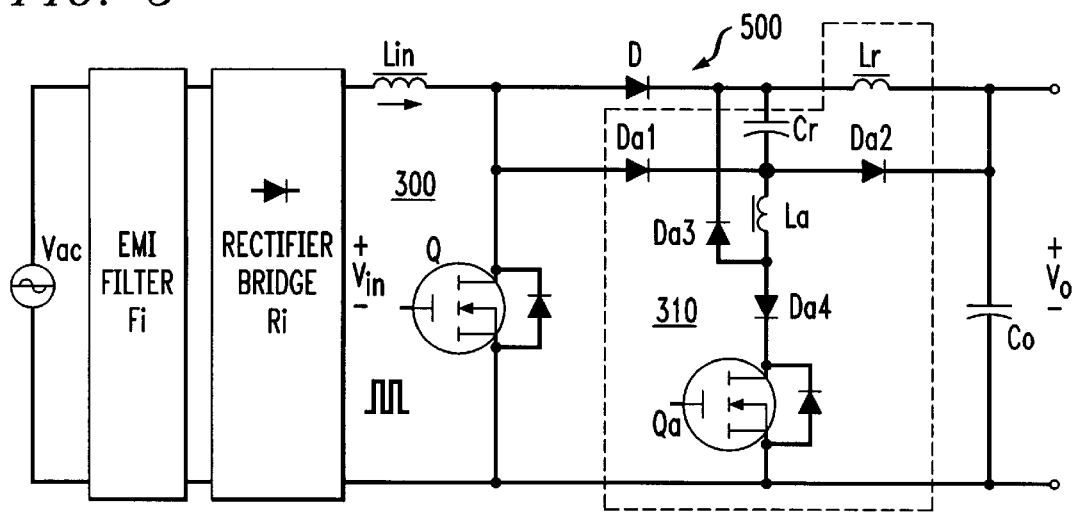
FIG. 5 illustrates a schematic diagram of an embodiment of a power supply employing the boost power converter of FIG. 3.

Turning now to FIG. 5, illustrated is a schematic diagram of an embodiment of a power supply 500 employing the boost converter 300 of FIG. 3. The power supply 500 includes an input source of electrical power $V_{ac}$, an electromagnetic interference (EMI) filter $F_i$, a rectifier bridge $R_i$ and the boost converter 300 (including the circuit 310 constructed according to the principles of the present invention). The construction and operation of the circuit 310 was previously described with respect to the FIGS. 3 and 4A–4H.

Figure 6:
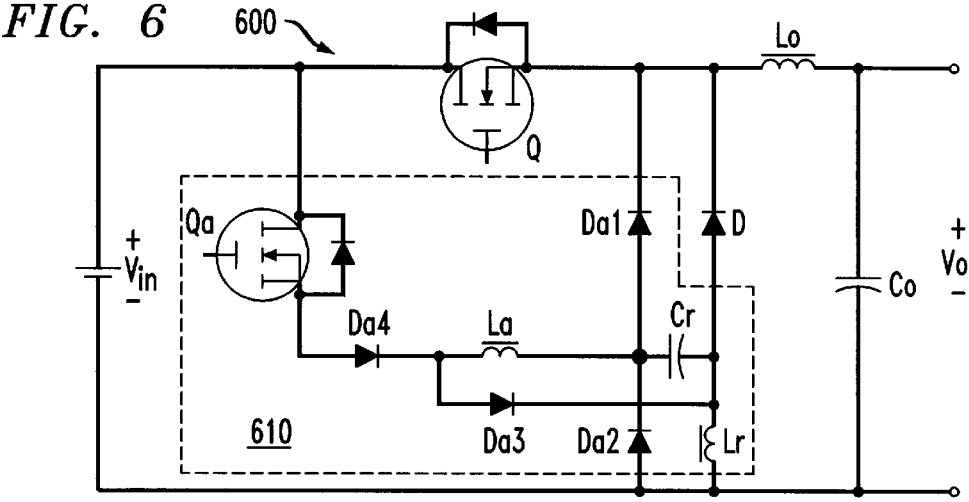
FIG. 6 illustrates a schematic diagram of an embodiment of a buck power converter employing another embodiment of a circuit constructed according to the principles of the present invention.

Turning now to FIG. 6, illustrated is a schematic diagram of an embodiment of a buck power converter (buck converter) 600 employing another embodiment of a circuit 610 constructed according to the principles of the present invention. The buck converter 600 includes an input voltage source $V_{in}$, a power switch Q, a rectifier (e.g., a power diode D), an inductor $L_o$, a capacitor $C_o$ and the circuit 610 of the present invention. The buck converter 600 provides a voltage $V_o$ at the output thereof. The circuit 610 includes an auxiliary switch (e.g., a MOSFET $Q_a$) and a blocking diode $D_{a4}$, an inductor $L_a$, an impedance element (e.g., a snubber inductor $L_r$), a snubber capacitor $C_r$, and a first, second and third auxiliary diode $D_{a1}$, $D_{a2}$, $D_{a3}$. The circuit 610 operates analogously to the circuit 310 previously illustrated and described with respect to the FIGS. 3 and 4A–4H.

Figure 7:
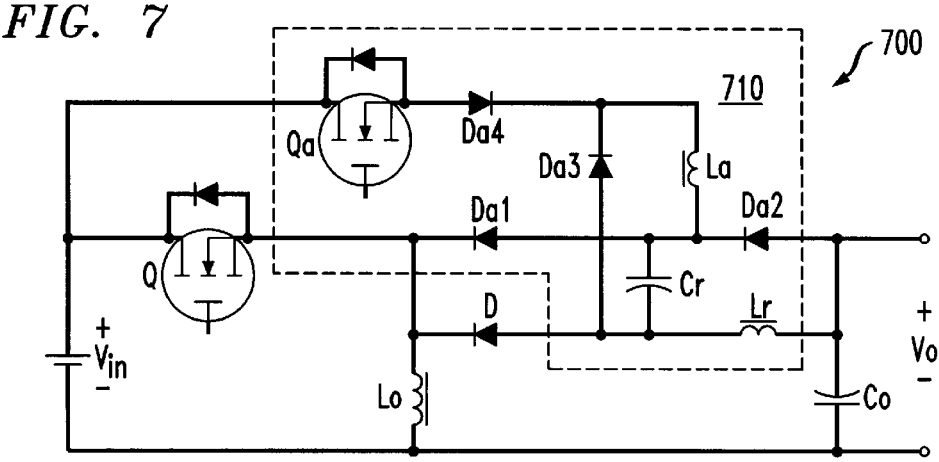
FIG. 7 illustrates a schematic diagram of an embodiment of a buck-boost power converter employing another embodiment of a circuit constructed according to the principles of the present invention.

Turning now to FIG. 7, illustrated is a schematic diagram of an embodiment of a buck-boost power converter (buck-boost converter) 700 employing another embodiment of a circuit 710 constructed according to the principles of the present invention. The buck-boost converter 700 includes an input voltage source $V_{in}$, a power switch Q, a rectifier (e.g., a power diode D), an inductor $L_o$, a capacitor $C_o$ and the circuit 710 of the present invention. The buck-boost converter 700 provides a voltage $V_o$ at the output thereof. The circuit 710 includes an auxiliary switch (e.g., a MOSFET $Q_a$) and a blocking diode $D_{a4}$, an inductor $L_a$ an impedance element (e.g., a snubber inductor $L_r$), a snubber capacitor $C_r$, and a first, second and third auxiliary diode $D_{a1}$, $D_{a2}$, $D_{a3}$. The circuit 710 operates analogously to the circuit 310 previously illustrated and described with respect to the FIGS. 3 and 4A–4H.

Those skilled in the art should understand the general operation of the previously introduced converters 300, 600 and 700 and, as a result, detailed explanations of the respective operations are not included herein. Of course, those skilled in the art should understand that the previously described embodiments of the circuit (and converter topologies and power supplies employed therewith) are submitted for illustrative purposes only, and other embodiments capable of reducing the dissipative losses associated with the power train of a converter employing an auxiliary switch and series-coupled impedance element are well within the broad scope of the present invention.

For a better understanding of power electronics, power converter topologies, such as the boost power converter, and snubber circuits, see: *Principles of Power Electronics*, by J. Kassakian and M. Schlecht, Addison-Wesley Publishing Company (1991), *High Efficiency Telecom Rectifier Using a Novel Soft-Switching Boost-Based Input Current Shaper*, by R. Streit, D. Tollik, IEEE Intelec Conference Records, pages 720–726 (1991), *Soft Transitions Power Factor Correction Circuit*, by I. D. Jitaru, Proceedings of HFPC, pages 202–208 (1993), U.S. Pat. No. 5,307,004, issued on Apr. 26, 1994, to Carsten and entitled *Soft Switching Boost and Buck Regulators*, U.S. Pat. No. 5,313,382, issued on May 17, 1994, to Farrington, entitled *Reduced Voltage/Zero Current Transition Boost Power Converter* and commonly assigned with the present invention. The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. In a power converter having a power train that includes a power switch and a rectifier for conducting forward currents from said power switch, a circuit that reduces switching losses associated with said power train, comprising:

an auxiliary switch and an inductor coupled to said power train that reduce a switching loss associated with said power switch; and an impedance element coupled between said rectifier and an output of said power converter that reduces a change in current through said rectifier thereby decreasing a reverse recovery current flowing therethrough.

2. The circuit as recited in claim 1 wherein said auxiliary switch is activated prior to transitioning said power switch from a nonconducting to a conducting state.

3. The circuit as recited in claim 1 further comprising a capacitor and first and second auxiliary diodes for recovering energy stored in said inductor and delivering said energy to an output of said power converter.

4. The circuit as recited in claim 1 wherein said impedance element is a snubber inductor, the circuit further comprising a capacitor and first and second auxiliary diodes for recovering energy stored in said snubber inductor and delivering said energy to an output of said power converter.

5. The circuit as recited in claim 1 wherein said rectifier comprises a power diode.

6. The circuit as recited in claim 1 wherein said auxiliary switch is a metal-oxide semiconductor field-effect transistor (MOSFET) having a body diode coupled thereto.

7. The circuit as recited in claim 1 wherein said power converter is selected from the group consisting of:

a boost converter;

a buck converter; and a buck-boost converter.

8. In a power converter having a power train that includes a power switch and a rectifier for conducting forward currents from said power switch, a method that reduces switching losses associated with said power train, comprising the steps of:

coupling an auxiliary switch and an inductor to said power train;

coupling an impedance element between said rectifier and an output of said power converter;

reducing a switching loss in said power switch with said auxiliary switch and said inductor; and reducing a change in current through said rectifier with said impedance element thereby decreasing a reverse recovery current flowing therethrough.

9. The method as recited in claim 8 further comprising the step of activating said auxiliary switch prior to transitioning said power switch from a nonconducting to a conducting state.

10. The method as recited in claim 8 further comprising the step of recovering energy stored in said inductor and delivering said energy to an output of said power converter.

11. The method as recited in claim 8 wherein said impedance element is a snubber inductor, the method further comprising the step of recovering energy stored in said snubber inductor and delivering said energy to an output of said power converter with a capacitor and first and second auxiliary diodes.

12. The method as recited in claim 8 wherein said rectifier comprises a power diode.

13. The method as recited in claim 8 wherein said auxiliary switch is a metal-oxide semiconductor field-effect transistor (MOSFET) having a body diode coupled thereto.

14. The method as recited in claim 8 wherein said power converter is selected from the group consisting of:

a boost converter;

a buck converter; and a buck-boost converter.

15. A power supply, comprising:

an input source of electrical power;

a power train, coupled between said input source and an output, including:

a power switch, and a power diode for conducting forward currents from said power switch; and a circuit that reduces switching losses associated with said power train, including:

an auxiliary switch and an inductor coupled to said to said power train that reduce a switching loss associated with said power switch; and a snubber inductor coupled between said power diode and said output that reduces a change in current through said power diode thereby decreasing a reverse recovery current flowing therethrough.

16. The power supply as recited in claim 15 further comprising an input electromagnetic interference (EMI) filter and input rectifier coupled between said input source of electrical power and said power train, the power supply still further comprising an output filter coupled to said output.

17. The power supply as recited in claim 15 wherein said power train further comprises an input inductor for storing energy from said input source of electrical power to be delivered to said output.

18. The power supply as recited in claim 15 wherein said circuit further comprises a capacitor and first and second auxiliary diodes for recovering energy stored in said inductor and delivering said energy to an output of said power supply.

19. The power supply as recited in claim 15 wherein said circuit further comprises a capacitor and first and second auxiliary diodes for recovering energy stored in said snubber inductor and delivering said energy to an output of said power supply.

20. The power supply as recited in claim 15 employing a topology selected from the group consisting of:

a boost topology;

a buck topology; and a buck-boost topology.

\* \* \* \* \*